Dec. 9, 1930. J. V. GIESLER 1,784,061
THERMOSTATICALLY CONTROLLED VALVE MECHANISM
Filed May 26, 1927   3 Sheets-Sheet 1
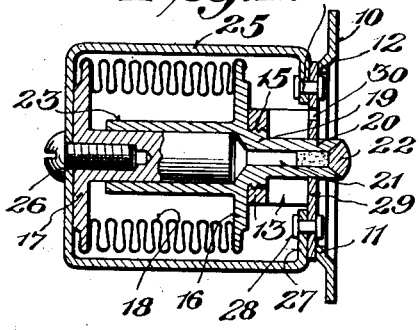
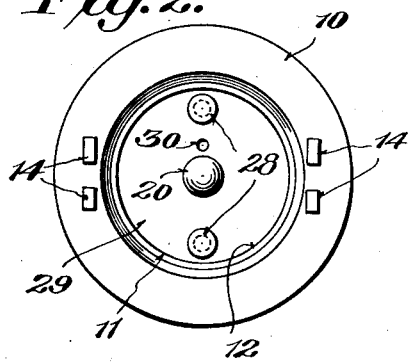
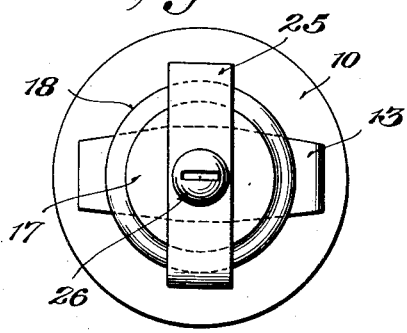
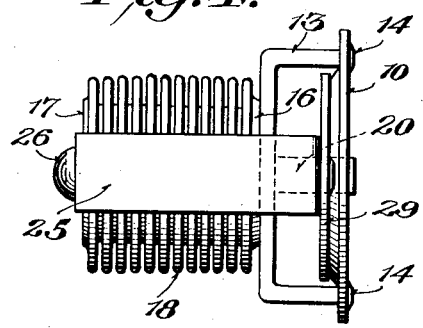
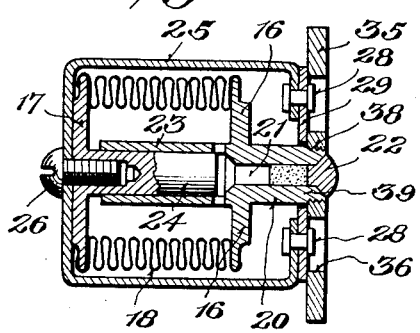
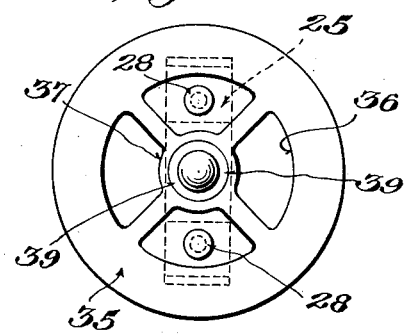
Inventor
Jean V. Giesler
By Cameron, Kirkham & Sutton
Attorneys Inventor
By Jean V. Giesler
Cameron, Kirkam & Sutton
Attorneys Dec. 9, 1930.                 J. V. GIESLER                 1,784,061
                 THERMOSTATICALLY CONTROLLED VALVE MECHANISM
                    Filed May 26, 1927      3 Sheets-Sheet 3

Inventor
Jean V. Giesler
By Cameron, Kirkam & Sutton
Attorneys

Patented Dec. 9, 1930

1,784,061

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

THERMOSTATICALLY-CONTROLLED VALVE MECHANISM

Application filed May 26, 1927. Serial No. 194,445.

This invention relates to thermostatically controlled valve mechanism, and particularly to valve mechanism of this character for regulating the temperature of the cooling medium circulated through the cooling system of internal combustion engines.

It is an object of this invention to provide a thermostatically-controlled valve mechanism of the type employing an expansible and collapsible thermostatic vessel wherein the pressure of the cooling medium on the movable end wall of said vessel does not tend to balance the pressure of said medium on the valve member.

Another object of this invention is to provide a device of the character described which is so constructed that the valve member has a movement of acceleration as it is withdrawn from the valve seat.

Another object of this invention is to provide a thermostatically-controlled valve mechanism of the choker type wherein the movable end of the thermostatic element and the valve member are at opposite sides of the fixed end of the thermostatic element, although on the same side of the valve seat.

Another object of this invention is to provide a thermostatically-controlled valve mechanism which is particularly simple and compact, and inexpensive to manufacture, so that it may be produced at low cost and be readily applied to a wide variety of cooling systems, or inserted into a radiator or the like, without special design of the parts to which it is to be applied.

Other objects relate to the provision of a thermostatically-controlled valve mechanism with a novel character of thermostatic element, and with novel constructions and arrangements of parts by which the elements are mounted in position, and guided and limited in their movements, etc. Yet other objects will appear as the description of the invention proceeds.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures:—

Fig. 1 is an axial section of a thermostatically-operated valve mechanism embodying the present invention;

Fig. 2 is an elevation of the valve seat end of said embodiment;

Fig. 3 is an elevation of the opposite end of said embodiment;

Fig. 4 is a side elevation of said embodiment;

Fig. 5 is an axial section of another embodiment of the present invention;

Fig. 6 is an end elevation of said embodiment;

Figure 7:
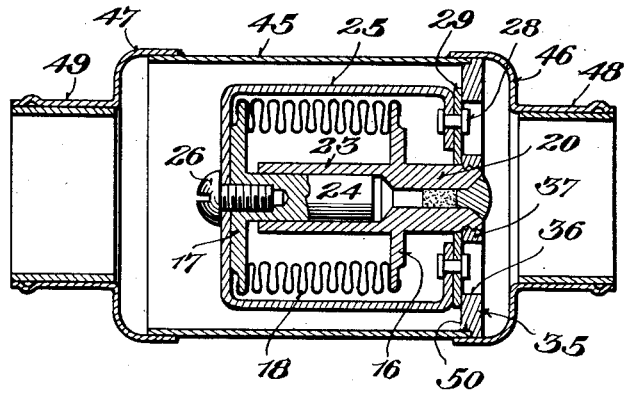
Fig. 7 is an axial section illustrating the embodiment of Fig. 5 assembled with a housing for connection into a water line and typifying one of a variety of suitable mountings for the several embodiments illustrated and described.

In the form shown in Fig. 1 a combined mounting and valve seat ring 10, of any suitable size, construction and material, is designed to be mounted in any suitable ways in or on any suitable support. As shown said ring 10 is dished or cupped to provide an annular valve seat 11 and has a central aperture 12 constituting the valve port. If desired, however, the ring 10 may lie in a single plane as in other embodiments to be described. Mounted on said ring 10 in any suitable way is a strap 13, shown as U-shaped and having tabs 14 which may be passed through suitable holes in the ring 10 and headed over, and soldered if desired, to secure the same fixedly in position. Intermediate its length said U-shaped strap is provided with means, as a threaded aperture 15, for attaching thereto the fixed or stationary end of the thermostat.

The thermostatic element may be of any suitable construction, but is preferably composed of a stationary end wall 16, a movable end wall 17, and a deeply-corrugated, flexible lateral wall 18, preferably of resilient metal, secured to said end walls in any suitable way, as by brazing. Said end walls 16 and 17 and lateral wall 18 provide an expansible and collapsible vessel which is designed to be charged with a thermosensitive fluid of any suitable character, preferably a volatile fluid. To mount the stationary end wall 16 on the strap 13, said end wall 16 is provided with a threaded boss 19 designed to be threaded into the aperture 15 of said strap. Said boss is also preferably extended to provide a post 20 which acts as a guide for the valve member as hereinafter explained, and said boss and post may also be utilized as a filling tube as shown, being provided with a filling opening 21 sealed in any suitable way at 22 after the thermosensitive fluid has been introduced into the thermostatic vessel. In order to guide and limit the movements of the movable end wall 17 with respect to the stationary end wall 16, the stationary end wall 16 may be provided interiorly of the thermostatic vessel with a tubular member 23, suitably attached thereto or integral therewith, and the movable end wall 17 may be provided with a post 24 designed to have a sliding fit within the tubular member 23, said post being integral with or suitably attached to the end wall 17.

Mounted on the movable end wall 17, in any suitable way, is a yoke 25 of any suitable construction, being shown as a generally U-shaped strap which is attached to the movable end wall 17, as by screw 26 threaded into an aperture in said end wall and the post 23, and having the free ends of its arms bent radially inward as shown at 27 so that they may be suitably attached, as by rivets 28, to a valve member 29 of any suitable construction and material. If desired, however, said yoke may take the form of a cage having more than two axially extending arms. As shown, the valve member 29 is of annular form and has a central aperture which slidably fits the post 20. If desired, a leakage aperture 30 may also be provided in said valve member.

The thermostatic valve unit being mounted by its ring 10 in any suitable way, as in the general manner illustrated in Fig. 7 for example, the valve member 29 is moved toward or away from its seat 11 as the thermostatic element contracts and expands, respectively. During these movements the movable end wall 17 is guided with respect to the stationary end wall 16 by the cooperation of the guide members 23, 24, and the valve member 29 is guided in its rectilinear movements by sliding on the post 20. The movement of the valve member is limited by engagement with the seat, upon contraction of the thermostatic element, and by engagement with the strap 13, upon expansion of the thermostatic element. When the thermostatic element is not mounted in cooperative relation with the ring 10, the extent of its contraction is limited by the engagement of the tubular guide member 23 with the movable end wall 17, the length of said tubular member 23 being preferably so selected as to insure that the thermostat can never be collapsed to an extent to injure the flexible wall thereof.

Whether the cooling medium is designed to flow through the valve port from right to left as viewed in Fig. 1, or from left to right as viewed in said figure, the pressure of said medium on the valve member is not balanced by the pressure of said medium on the movable end wall 17 of the thermostatic element. If the direction of flow is from left to right as viewed in Fig. 1, the pressures on the valve member and on the movable end wall, tending to maintain the valve member closed, are additive, and the pressure within the thermostat must be sufficiently great, before movement of the valve can occur, to move both the valve member and the movable end wall against the pressure of the fluid. As soon as the valve member moves away from its seat, however, the pressures on the opposite sides of the valve member tend to become equalized, while the pressure on the movable end wall of the thermostatic element remains unbalanced. The total pressure opposing movement of the valve member is therefore decreased, and the pressure within the thermostatic element, which was sufficient to overcome the pressure on both the valve member and the movable end wall, is now in excess of that required to cause expansion of the thermostatic element against the pressure on its movable end wall, and said element therefore expands with an accelerated movement, owing to excess pressure within the same, so as to move the valve member rapidly away from its seat.

In the form shown in Figs. 5 and 6, the combined mounting and valve seat ring 35 takes the form of a spider having suitable apertures 36 therethrough to constitute the valve port, and having a central annular hub portion 37 which is provided with a threaded aperture 38. In this construction the tubular extension 20 on the stationary end wall 16 of the thermostat is threaded at its extremity, as shown at 39, so as to be engaged in said threaded aperture 38. In this construction the valve seat is provided by the inner face of the central annular section 37 as well as by the peripheral annular section of the spider 35, so that the valve member 29 closes the valve port at both its inner and outer periphery, thereby preventing leakage between the valve member and its guide 20, as may occur in the embodiment of Fig. 1. Movement of the valve member away from its seat is limited by engagement with stationary end wall 16. Otherwise the construction of Figs. 5 and 6 is, or may be, the same as in the embodiment of Figs. 1 to 4.

Fig. 7 illustrates a suitable manner of mounting a thermostatically-operated valve mechanism in conformity with the present invention. As here shown, the thermostatically-operated valve mechanism is mounted within a tubular housing 45 which is closed at its opposite ends by flanged end members 46 and 47 provided with nipples 48 and 49, respectively, for the attachment thereto of the usual hose connections. The combined mounting and valve seat ring, such as 35 in the embodiment of Figs. 5 and 6, is here shown as having a cut-away portion 50 of such a size as to fit into the tubular wall 45, while the ring is of such size as to fit within the end member 46. Ring 35 may therefore be inserted into the end of the housing 45 and the end member 46 mounted thereover, in which position the ring 35 is fixedly clamped in position against displacement. The members 46 and 47 may then be soldered or otherwise suitably attached to the housing wall 45.

Figure 8:
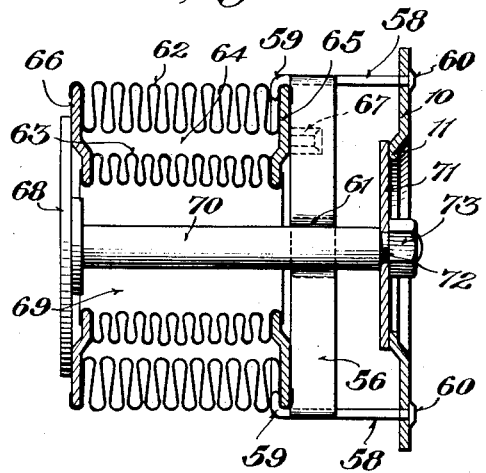
Fig. 8 is an axial section of another embodiment.
Figure 9:
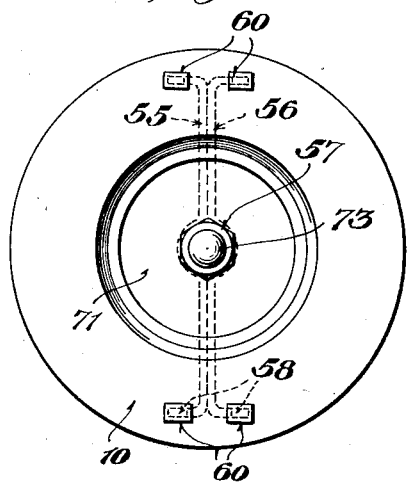
Fig. 9 is an end elevation of said embodiment.

In the form shown in Figs. 8 and 9, the combined mounting and valve seat ring 10 is of the construction heretofore described in conjunction with the embodiment of Figs. 1 to 4 inclusive. In this embodiment, however, the U-shaped support for the stationary end wall of the thermostat is composed of a pair of members 55 and 56, which may be conveniently formed from sheet metal. One or both of these members, intermediate its length, is bent at 57 to provide a tubular aperture, and one or both of these members are provided at the ends with axially extending tabs 58 and 59. The ring 10, as in the embodiment of Figs. 1 to 4 inclusive, is provided with apertures 60 in such position as to receive the axially extending tabs 58 on the members 55 and 56 when the latter are engaged in face contact as illustrated in Fig. 9. Said tabs 58 may be headed over or otherwise suitably attached, and soldered if desired, to the ring 10, and when so attached to said ring the members 55 and 56 constitute a diametrically extending bar which is provided midway of its length with a circular aperture 61 to receive the valve rod slidably.

The thermostatic element in the embodiment here illustrated is composed of a pair of concentrically arranged deeply-corrugated, flexible walls 62 and 63 which provide an intermediate annular expansible and collapsible chamber 64 to receive the volatile or other thermosensitive fluid. Said corrugated walls 62 and 63 are attached in any suitable way, as by brazing, to annular end walls 65 and 66, one of which is provided with a filling plug 67. End wall 65 is mounted on the cross bar 55, 56 in any suitable way, as by bending the tabs 59 into clamping engagement with said end wall 65.

Movable end wall 66 is connected in any suitable way to a valve rod which extends axially through the chamber 69 within the inner corrugated wall 63. In the form shown a disk 68 is suitably attached to the annular end wall 66, as by brazing, or in place of a disk 68 a spider may be employed so as to permit circulation through said spider and the chamber 69 within the inner corrugated wall 63. The disk or spider 68 carries in any suitable way a valve rod 70 which, at its opposite end, is suitably connected to a valve disk 71 of any suitable construction, said rod being shown as provided with a reduced threaded extension 72 so that the valve disk 71 may be clamped against the shoulder thereby provided by a nut 73. The valve rod 70 is guided in its movements by the aperture 61 in the cross bar 55, 56, and the movement of the valve member 71 is limited by its engagement with the valve seat 11 and the face of the cross bar 55, 56.

Figure 10:
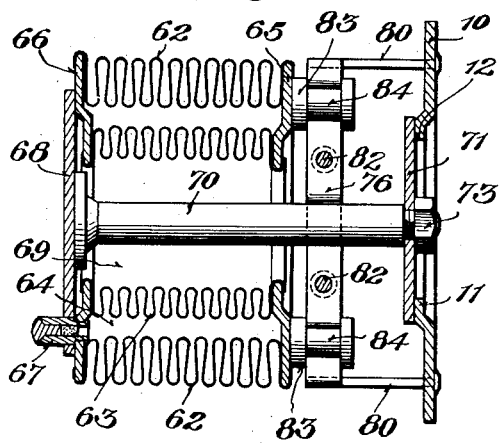
Fig. 10 is an axial section of another embodiment.
Figure 11:
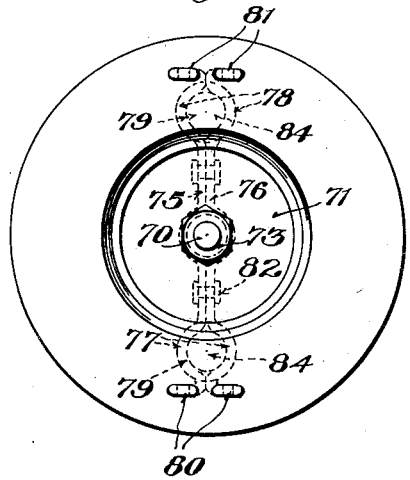
Fig. 11 is an end elevation of said embodiment.

In the form shown in Figs. 10 and 11 the thermostat support, which may be conveniently formed from sheet metal, is composed of a pair of members 75 and 76 one or both of which are bent, adjacent each end as shown at 77 and 78, so that when assembled, a pair of generally circular apertures 79 are provided. One or both of the members 75 and 76 are also provided with axially extending tabs 80, as in the embodiment of Figs. 8 and 9, to be received in apertures 81 in the ring 12, where they may be headed over or otherwise suitable attached, and soldered if desired. In this construction, however, the attachment of the members 75, 76 to the ring 12 is not relied upon to maintain said members in operative position with their lateral faces in contact as illustrated, although this may be done if desired, but said members 75 and 76 are attached together by one or more rivets 82.

Stationary end wall 65 of the thermostatic element has suitably mounted thereon as by soldering or brazing a pair of posts 83 which are reduced in diameter intermediate their length as shown at 84, said reduced portions 84 having a diameter corresponding with the diameter of the apertures 79 formed by the bent portions 77 and 78 in the members 75, 76. Members 75 and 76 are assembled about the posts 83, with the bent portions 77 and 78 thereof engaging the reduced portions 84 of said posts, whereupon said members 75 and 76 may be secured together by the rivets 82, and thereby be fixedly attached to the end wall of the thermostatic element. Said members 75 and 76 may thereafter be attached to the ring 12 as heretofore explained. Otherwise the construction of Figs. 10 and 11 is, or may be, the same as in the embodiment of Figs. 8 and 9.

Figure 12:
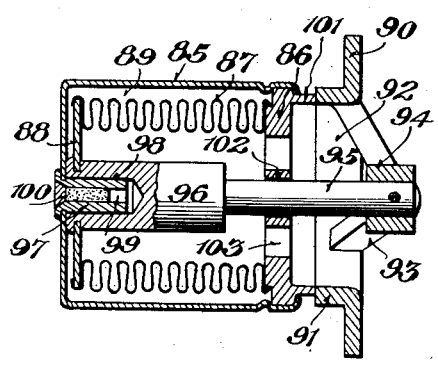
Fig. 12 is an axial section of another embodiment.

In the form shown in Fig. 12, the thermostatic element takes the form of a cup-type thermostat, being composed of an outer cup-shaped wall 85 suitably secured, as by soldering or brazing, to an end wall 86, and an inner deeply-corrugated, flexible wall 87, also suitably secured, as by soldering or brazing, to said end wall 86. The opposite end of said flexible wall 87 is suitably attached, as by soldering or brazing, to a stationary end wall 88, and within said cup-like wall 85, and outside of said flexible wall 87 and end wall 88, is a confined space 89 designed to receive the volatile or other thermosensitive fluid.

End wall 88 is fixedly attached in any suitable way to a combined mounting and valve seat ring 90 of any suitable construction. In the form shown, said ring is provided with an axially extending flange 91 which constitutes the valve seat and within which is the valve port 92. Projecting from said ring, and preferably integral therewith, are a plurality of spider arms 93 which lead to a centrally arranged hub 94. Fixedly secured within the central aperture of said hub 94, as by a pin, is a post 95 which is enlarged as shown at 96 and suitably attached to the wall 88, as by having a central portion of reduced cross section passed through an aperture in said wall 88 and headed over on, and preferably brazed to, said end wall 88, so as to make a fluid-tight joint therewith. The end wall of the cup 85 may also be provided with an inwardly extending post 97 secured thereto in any suitable way, and the enlargement 96 may be provided with a recess 98 which slidably receives said post 97 in order to guide the cup in its rectilinear movements. Said post 97 and recess 98 may be if desired of such length as to constitute a stop to limit the extent to which the flexible wall 87 may be expanded when the thermostatic element is not mounted on the ring 90. Post 97 is also preferably utilized as a filling tube and is shown as provided with an aperture 99 therethrough which is sealed as shown at 100 after the thermosensitive fluid has been introduced into the cup.

End wall 86, in the form shown is provided with an annular flange 101 of a size suitable to seat on the valve seat 91, but if desired the flange 101 may be omitted and the end wall 86 may seat directly on the flange 91. End wall 86 is provided with a central aperture 102 which slidably receives the post 95, and is also preferably provided with one or more apertures 103 so that the interior of the flexible wall 87 may be open to the circulating medium. Post 95 is preferably provided with means to engage the end wall or valve member 86 to limit its extent of movement away from the valve seat 91, and when the said post is provided with an enlarged portion 96 the shoulder between the two portions of the post 95 may be utilized as a stop, as illustrated in Fig. 12.

In this embodiment expansion of the thermosensitive fluid in the expansible and collapsible chamber 89 causes the cup to move to the left, as viewed in Fig. 12, accompanied by contraction of the flexible wall 87, the end wall or valve member 86 being thereby moved away from the valve seat 91. During this movement member 86 is guided on the post 95 and its extent of movement is limited by the shoulder between said post and its enlargement 96. On contraction of the volatile fluid, the flexible wall expands and the cup moves to the right as viewed in Fig. 12 until the member 86 or its flange 101 is engaged with the valve seat 91. This embodiment lends itself particularly to installation within a radiator, as the thermostatically-operated valve unit illustrated may be inserted through an aperture in the radiator wall until the ring 90 contacts the wall of the radiator around said aperture—in which position it may be secured in any suitable way.

Figure 13:
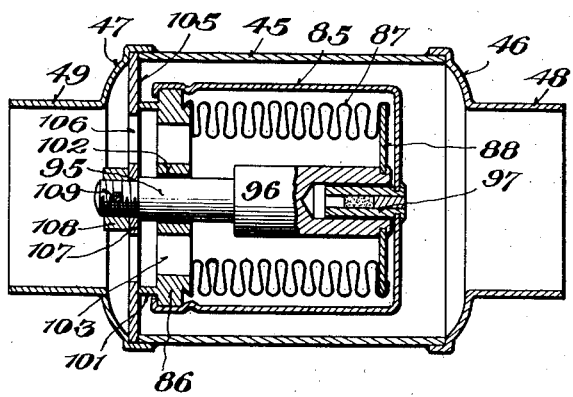
Fig. 13 is an axial section of yet another embodiment.

Construction of the type illustrated in Fig. 12, however, may also be mounted in a housing in the hose line as illustrated in Fig. 13, where the combined mounting and valve seat ring 105 is shown as clamped between the tubular wall 45 and the end member 47 of said housing. The construction of Fig. 13 is, or may be, the same as in Fig. 12, but the ring 105 is illustrated as a flat disk provided with apertures 106 and a central hub portion 107 to which the end of the post 95 is attached as by a nut 108 and pin 109, and valve member 86, either with or without a flange 101, seats directly on said ring.

In each of the embodiments the thermostat may be charged with volatile fluid at a pressure below that of the surrounding medium so that, upon the occurrence of a leak when both the interior and exterior pressures become equalized, said thermostatic element will expand, by reason of its inherent resilience, or the action of a spring if desired, or the pressure of the circulating medium thereon, to open the valve and permit free circulation of the cooling medium.

It is to be expressly understood that the valve port and valve member may be made of any suitable size in conformity with the rate of circulation desired, the extent of pressure desired on the valve member and movable end wall, etc., and the valve mechanism may be installed so that the pressure of the circulating medium tends either to open or to close the valve.

It will therefore be perceived that a simple, compact, and inexpensive thermostatically-controlled valve mechanism has been provided, and one wherein the tendency of the pressures on the movable end of the thermostatic element and on the valve member to balance each other may be eliminated, and wherein said pressures may be additive, and whereby, if desired, an accelerated opening movement of the valve member may be effected. The valve member and movable end wall of the thermostatic element are disposed on opposite sides of the stationary end of the thermostatic element, and other novel constructions and arrangements of the thermostatic element, its supporting means, the means for guiding and limiting the movement of the valve member, etc., have also been provided.

While the embodiments of the invention illustrated on the drawings have been described with considerable particularity, it is to be expressly understood that the invention is not to be restricted thereto, as the same is capable of receiving a variety of mechanical expressions, some of which will now readily suggest themselves to those skilled in the art, while changes may be made in the details of construction, arrangement and proportion of parts, and certain features used without other features, without departing from the spirit of this invention. Reference is therefore to be had to the claims hereto appended for a definition of the limits of said invention.

What is claimed is:

1. In a thermostatically-operated valve mechanism for controlling the circulation of cooling medium through the cooling system of an internal combustion engine, the combination of a valve seat ring, a thermostat having movable and stationary end walls, the movable end wall being on the opposite side of the stationary end wall from said valve seat ring and moving away from said ring on expansion of said thermostat, and a valve member disposed between said stationary end wall and said valve seat ring and operatively connected to said thermostat.

2. In a thermostatically-operated valve mechanism for controlling the circulation of cooling medium through the cooling system of an internal combustion engine, the combination of a valve seat ring, a thermostat support mounted on said ring, a valve member adapted to cooperate with said ring, a thermostat mounted on said support and having its movable end on the opposite side of said support from said ring, said thermostat expanding to move said movable end away from said ring, and means connecting said valve member and the movable end of said thermostat.

3. In a thermostatically-operated valve mechanism for controlling the circulation of cooling medium through the cooling system of an internal combustion engine, the combination of a valve seat ring, a U-shaped thermostat support mounted on said ring, a valve member disposed between said support and ring and adapted to cooperate with said ring, a thermostat mounted on said support and having its movable end on the opposite side of said support from said ring, and means connecting said valve member and the movable end of said thermostat.

4. In a thermostatically-operated valve mechanism for controlling the circulation of cooling medium through the cooling system of an internal combustion engine, the combination of a valve seat ring, a thermostat support mounted on said ring and comprising sections secured in unitary relationship and embracing stationary portions of the thermostat, a valve member adapted to cooperate with said ring, a thermostat mounted on said support and having its movable end on the opposite side thereof from said ring, and means connecting said valve member and the movable end of said thermostat.

5. In a thermostatically-operated valve mechanism for controlling the circulation of cooling medium through the cooling system of an internal combustion engine, the combination of a valve seat ring, a thermostat support mounted on said ring, a valve member adapted to cooperate with said ring, and a thermostat mounted on said support with a movable end on the opposite side of said support from said ring, said thermostat expanding to move said movable end away from said ring, said thermostat providing an annular expansible and collapsible chamber to contain a thermosensitive fluid and being operatively connected to said valve member 6. In a thermostatically-operated valve mechanism for controlling the circulation of cooling medium through the cooling system of an internal combustion engine, the combination of a valve seat ring, a thermostat support mounted on said ring, a valve member adapted to cooperate with said ring, a thermostat mounted on said support with its movable end on the opposite side of said support from said ring, said thermostat including coaxially arranged exterior and interior flexible walls providing an annular chamber therebetween to contain a thermosensitive fluid, and means connecting the movable end of said thermostat and said valve member.

7. In a thermostatically-operated valve mechanism for controlling the circulation of cooling medium through the cooling system off an internal combustion engine, the combination of a valve seat ring, a thermostat support mounted on said ring and spaced axially therefrom, a valve member adapted to cooperate with said ring, and a thermostat mounted on said support with a movable end on the opposite side of said support from said ring, said thermostat being operatively connected to said valve member.

8. In a thermostatically-operated valve mechanism for controlling the circulation of cooling medium through the cooling system of an internal combustion engine, the combination of a valve seat ring, a thermostat support mounted on said ring, a valve member adapted to cooperate with said ring, a thermostat mounted on said support with a movable end on the opposite side of said support from said ring, said movable end moving away from said ring on expansion of said thermostat, said thermostat being operatively connected to said valve member, and means for guiding said valve member in its opening and closing movements, said means including a member fixed to the stationary end of said thermostat.

9. In a thermostatically-operated valve mechanism for controlling the circulation of cooling medium through the cooling system of an internal combustion engine, the combination of a valve seat ring, a thermostat support mounted on said ring, a valve member adapted to cooperate with said ring, a thermostat mounted on said support with its movable end on the opposite side thereof from said ring, said thermostat being operatively connected to said valve member, and means to limit the movement of said valve member away from said ring.

10. In a thermostatically-operated valve mechanism for controlling the circulation of cooling medium through the cooling system of an internal combustion enegine, the combination of a valve seat ring, a thermostat support mounted on said ring and composed of sections adapted to be secured to said ring, a valve member adapted to cooperate with said ring, a thermostat mounted on said support with its movable end on the opposite side of said support from said ring, and means connecting the movable end of said thermostat and said valve member.

11. In a thermostatically-operated valve mechanism for controlling the circulation of cooling medium through the cooling system of an internal combustion engine, the combination of a valve seat ring, a thermostat support mounted on said ring, a valve member adapted to cooperate with said ring, and a thermostat mounted on said support with a movable end on the opposite side of said support from said ring, said thermostat being operatively connected to said valve member, and said thermostat support affording a guide for said valve member.

12. In a thermostatically-operated valve mechanism for controlling the circulation of cooling medium through the cooling system of an internal combustion engine, the combination of a valve seat ring, a valve member adapted to cooperate with said ring, a thermostat support carried by said ring, a thermostat carried by said support, said thermostat including concentrically arranged flexible walls providing an annular chamber for thermosensitive fluid, and means connecting said valve member and thermostat extending within the central chamber of said thermostat.

13. In a thermostatically-operated valve mechanism for controlling the circulation of cooling medium through the cooling system of an internal combustion engine, the combination of a valve seat ring, a thermostat support mounted on said ring, a thermostat mounted on said support, and having an annular chamber with an inner flexible wall, and a valve member adapted to cooperate with said ring, said thermostat having a movable end on the opposite side of said support from said ring and movable away from said ring on expansion of said thermostat, and said valve member being operatively connected to said thermostat.

14. In a thermostatically-operated valve mechanism for controlling the circulation of cooling medium through the cooling system of an internal combustion engine, the combination of a valve seat ring, a thermostat support, a valve member adapted to cooperate with said ring, a thermostat mounted on said support and composed of inner and outer expansible and collapsible tubular walls, said thermostat being spaced from said valve seat ring to provide a passage for the fluid flowing around said thermostat, and means connecting said thermostat and said valve member.

15. In a thermostatically-operated valve mechanism for controlling the circulation of cooling medium through the cooling system of an internal combustion engine, the combination of a valve seat ring, a thermostat support mounted on said ring, a valve member adapted to cooperate with said ring, a thermostat mounted on said support and composed of inner and outer walls providing an annular chamber for thermosensitive fluid, said thermostat having its movable end on the opposite side of said support from said ring and movable away from said ring on expansion of said thermostat, and means connecting the movable end of said thermostat and said valve member, said means extending axially within said annular members.

16. Means for controlling the circulation of cooling medium in an internal combustion engine comprising a valve arranged to open against the pressure of the cooling medium, and a thermostat located in the medium on the pressure side of the valve, said thermostat having an elastic chamber having a stationary end wall and a movable end wall on the opposite side of said stationary end wall from said valve and arranged to open the valve by expansion of said chamber, whereby initial opening of the valve will release the pressure of the medium on the valve and the chamber, and thus accelerate the opening of the valve.

17. In a thermostatically operated valve mechanism for controlling the circulation of cooling medium through the cooling system of an internal combustion engine, the combination of a valve seat ring, a thermostat having movable and stationary end walls, the movable end wall being on the opposite side of the stationary end wall from said valve seat ring and moving away from said ring on expansion of said thermostat, a valve member disposed between said stationary end well and said valve seat ring, and a U-shaped member embracing said thermostat and attached at its opposite ends to said movable end wall and said valve member for operating the same.

18. In a thermostatically operated valve mechanism for controlling the circulation of cooling medium through the cooling system of an internal combustion engine, the combination of a valve seat ring, a thermostat having a cylindrical outer lateral wall, a corrugated inner wall forming with said cylindrical wall a chamber for a thermosensitive fluid, and movable and stationary end walls, the movable end wall being on the opposite side of the stationary end wall from said valve seat ring and moving away from said ring on expansion of said thermostat, and a valve member disposed between said stationary end wall and said valve seat ring and operatively connected to said thermostat.

In testimony whereof I have signed this specification.

JEAN V. GIESLER.